United States Patent [19]

Takakura et al.

[11] Patent Number: 5,913,395
[45] Date of Patent: Jun. 22, 1999

[54] SINGLE-FACED DISK TYPE FRICTION ENGAGEMENT DEVICE OF EQUALIZED FRICTIONAL SURFACE TEMPERATURE

[75] Inventors: Norio Takakura; Han Zhi-peng, both of Hokkaido, Japan

[73] Assignee: Dynax Corporation, Chitose, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/749,139

[22] Filed: Nov. 14, 1996

[51] Int. Cl.⁶ ...................................... F16D 13/72
[52] U.S. Cl. .................... 192/70.12; 192/70.14; 192/113.3
[58] Field of Search ............. 192/107 R, 70.12, 192/70.14, 85 AA, 113.21, 113.34, 113.3

[56] References Cited

U.S. PATENT DOCUMENTS

| | | | |
|---|---|---|---|
| 1,949,053 | 2/1934 | Kutter | 192/107 R X |
| 5,012,908 | 5/1991 | Kobayashi et al. | 192/85 AA X |
| 5,226,517 | 7/1993 | Grochowski | 192/85 AA |
| 5,452,784 | 9/1995 | Miyoshi et al. | 192/70.14 X |
| 5,638,932 | 6/1997 | Mizukami | 192/70.12 |
| 5,829,566 | 11/1998 | Winks et al. | 192/70.12 |

FOREIGN PATENT DOCUMENTS

| | | | |
|---|---|---|---|
| 3326409 | 3/1984 | Germany | 192/70.14 |

*Primary Examiner*—Charles A. Marmor
*Assistant Examiner*—Saúl Rodríguez
*Attorney, Agent, or Firm*—Quarles & Brady

[57] ABSTRACT

A friction engagement device has single-faced externally toothed disks interleaved with single-faced internally toothed disks which are engageable by an annular piston. The thickness of the externally toothed disks is less than the thickness of the internally toothed disks for improved heat dissipation performance.

1 Claim, 3 Drawing Sheets

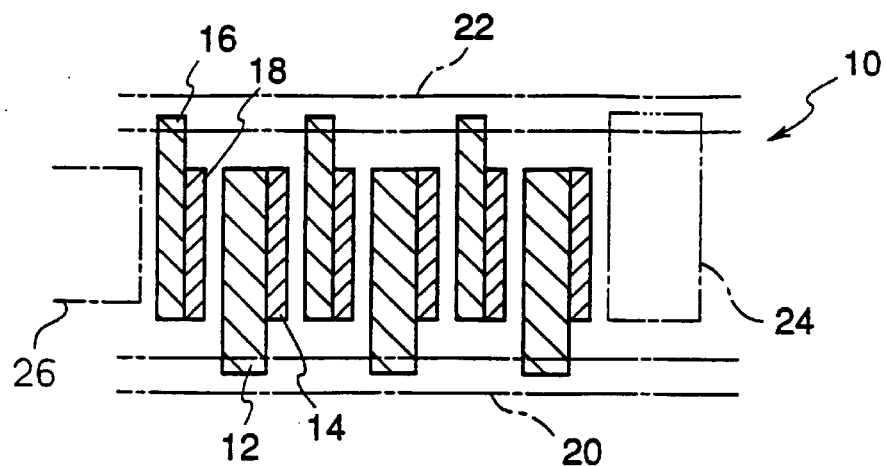
F I G. 1
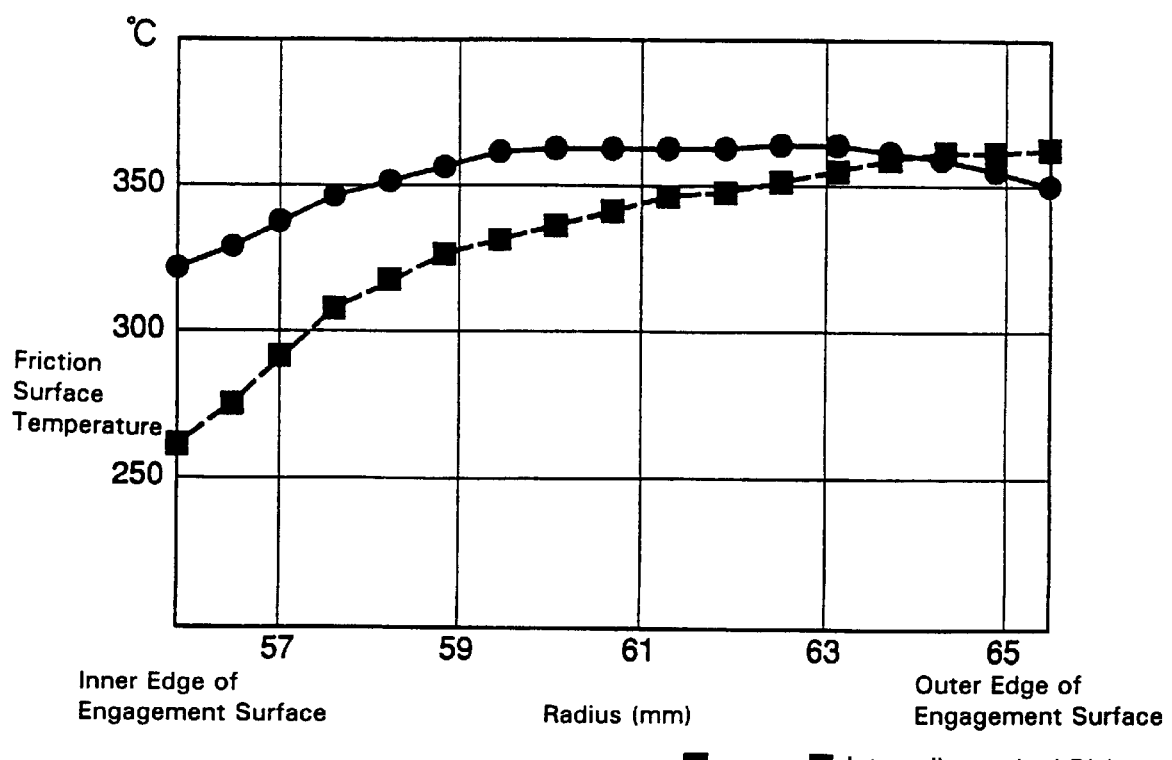
F I G. 2

SINGLE-FACED DISK TYPE FRICTION ENGAGEMENT DEVICE OF EQUALIZED FRICTIONAL SURFACE TEMPERATURE

FIELD OF THE INVENTION

The present invention relates to a friction engagement device to be used in an automatic transmission and others.

BACKGROUND OF THE INVENTION

In a friction engagement device 30, as shown in FIG. 3, an internally-toothed disk 34 splined to a hub 32 and an externally-toothed disk 38 splined to a drum 36 are alternately arranged. A friction material 40 is secured on both sides of the internally-toothed disk 34. The internally-toothed disk 34 and externally-toothed disk 38 are engaged to perform torque transmission by the axial movement of a hydraulically-actuated piston 42.

In this type of friction engagement device 30, there occurs friction between the surface of the friction material 40 and the externally-toothed disk 38, producing high heat in these disk surfaces of engagement. Since the heat occurring in the disk engagement surfaces moves mostly to the externally-toothed disk 38 side, the externally-toothed disk 38 is increased in thickness for the purpose of increasing the thermal capacity thereof, thereby improving heat dissipation performance at the friction engagement device 30. However, if the thickness of the externally-toothed disk 38 is increased in an attempt to improve the heat dissipation performance as stated above, the axial length of the friction engagement device 30 also increases, resulting in a failure to meet demands for reducing size and weight.

FIG. 4 shows an example of an arrangement of an internally-toothed disk and an externally-toothed disk in another prior art friction engagement device 50, which was intended to obviate the drawbacks of the friction engagement device shown in FIG. 3. The friction engagement device 50 is provided with a so called single-faced internally-toothed disk 52 and a single-faced externally-toothed disk 54. The internally-toothed disk 52 and the externally-toothed disk 54 are so arranged as to engage with friction material 56. Heat generated in the surfaces of engagement can disperse into the internally-toothed disk 52 and the externally-toothed disk 54. Since the heat can disperse into the internally-toothed disk 52 and the externally-toothed disk 54, it is unnecessary to increase the thickness of the disks 52 and 54. Therefore, it is possible to decrease the axial length of the friction engagement device 50 while maintaining as high a heat dissipation performance as the friction engagement device shown in FIG. 3.

The present inventors have further conducted research into the principle of heat generation and the routes of heat transmission in the prior art single-faced friction engagement device mentioned above, finding that the prior art friction engagement device shown in FIG. 4 still had room for improvement.

First, the inventors noticed that the quantity of heat generated in the surface of engagement increases as it goes outward in the radial direction. That is, since it is believed that a sliding stroke at the time of friction generation is longer as the surface extends radially outward and the force exerted by piston 58 is constant over the entire surface of engagement, the quantity of heat generated in the surface of engagement increases as the surface extends radially outward.

Next, a study was conducted of the routes of heat transmission in the friction engagement device 50. The heat is dissipated to oil or transmitted to a hub 60 and a drum 62 through the internally-toothed disk 52 and the externally-toothed disk 54. The quantity of heat generated in the surface of engagement, however, increases radially outwardly along the surface as described above. The heat generated at the externally-toothed disk 54 is likely to escape to the drum 62. However, the heat generated at the outer edge of the internally-toothed disk 52 is stored in the vicinity of the outer edge because of the presence of a long distance between the outer edge and the hub 60.

FIG. 5 shows the temperature distribution of the internally-toothed disk 52 and the externally-toothed disk 54 in the friction engagement device of FIG. 4. As is clear from this drawing, the internally-toothed disk 52 is at a considerably higher temperature in the vicinity of the outer edge than the externally-toothed disk 54. This indicates that the internally-toothed disk 52 is used less advantageously than the externally-toothed disk 54.

Noticing the principle of heat generation and the routes of heat transmission in a single-faced friction engagement device, the present invention has as an object to equalize the temperature at the frictional surface of this type of friction engagement device.

In other words, the present invention has as an object to decrease the axial length of the friction engagement device while maintaining the heat dissipation performance (heat resistance) of the prior art device.

SUMMARY OF THE INVENTION

The present invention has solved the above-described problems by providing a friction engagement device in which an internally-toothed disk secured with a friction material on one side in the axial direction and an externally-toothed disk secured with a friction material on one side in the axial direction are arranged alternately, so that the internally-toothed disk and the externally-toothed disk are engaged by a piston to thereby transmit a torque, and further in which the externally-toothed disk is less in thickness than the internally-toothed disk.

In an automatic transmission for example, the internally-toothed disk is splined to a hub, while the externally-toothed disk is splined to a drum. Alternatively, the internally-toothed disk may be splined to the drum and the externally-toothed disk splined to a housing of the automatic transmission. It is important that the internally-toothed disk have a route of heat transmission toward the inside, and that the externally-toothed disk have a route of heat transmission toward the outside. Hereinafter an explanation will be made of the internally-toothed disk splined to the hub and the externally-toothed disk splined to the drum.

As already explained, the quantity of heat generated in the surfaces of engagement increases in the radially outward direction when the internally-toothed disk and the externally-toothed disk make frictional engagement. In the case of the internally-toothed disk, the heat generated by the frictional engagement is dispersed to oil or transmitted to the hub. On the other hand, the heat generated by the frictional engagement of the externally-toothed disk is dispersed to the oil or transmitted to the drum.

The quantity of heat thus transmitted increases with an increase in temperature difference and a decrease in the distance of heat transmission. If the hub temperature is the same as the drum temperature, the quantity of heat to be transmitted is inversely proportional to the distance of heat transmission. In the single-faced friction engagement device, as described above, the quantity of heat generated increases radially outwardly and the temperature reaches a maximum value in the vicinity of the outer edge of the internally-toothed disk. In addition, the shorter the distance of heat transmission, the easier the disks are cooled.

That is, in the externally-toothed disk, the distance from the portion at which the temperature reaches the maximum value to the drum is short; in the internally-toothed disk the distance from the outer edge in which the temperature reaches the maximum value to the hub is long. Therefore, in the externally-toothed disk a large quantity of heat is likely to move as compared with the internally-toothed disk. The externally-toothed disk, if thinner than the internally-toothed disk, has as high a heat dissipation performance as the internally-toothed disk.

Therefore, when the axial length of the friction engagement device remains unchanged, the heat dissipation performance can be improved by increasing the thickness of the internally-toothed disk correspondingly. When the thickness of the internally-toothed disk is not changed, it is possible to decrease the axial length of the friction engagement device by correspondingly decreasing the thickness of the externally-toothed disk.

BRIEF DESCRIPTION OF THE DRAWINGS

FIG. 1 is a sectional view showing an embodiment of a friction engagement device according to the present invention;

FIG. 2 is a temperature distribution graph of an internally-toothed disk and an externally-toothed disk in the friction engagement device of FIG. 1;

DETAILED DESCRIPTION OF THE PREFERRED EMBODIMENT

Figure 3:
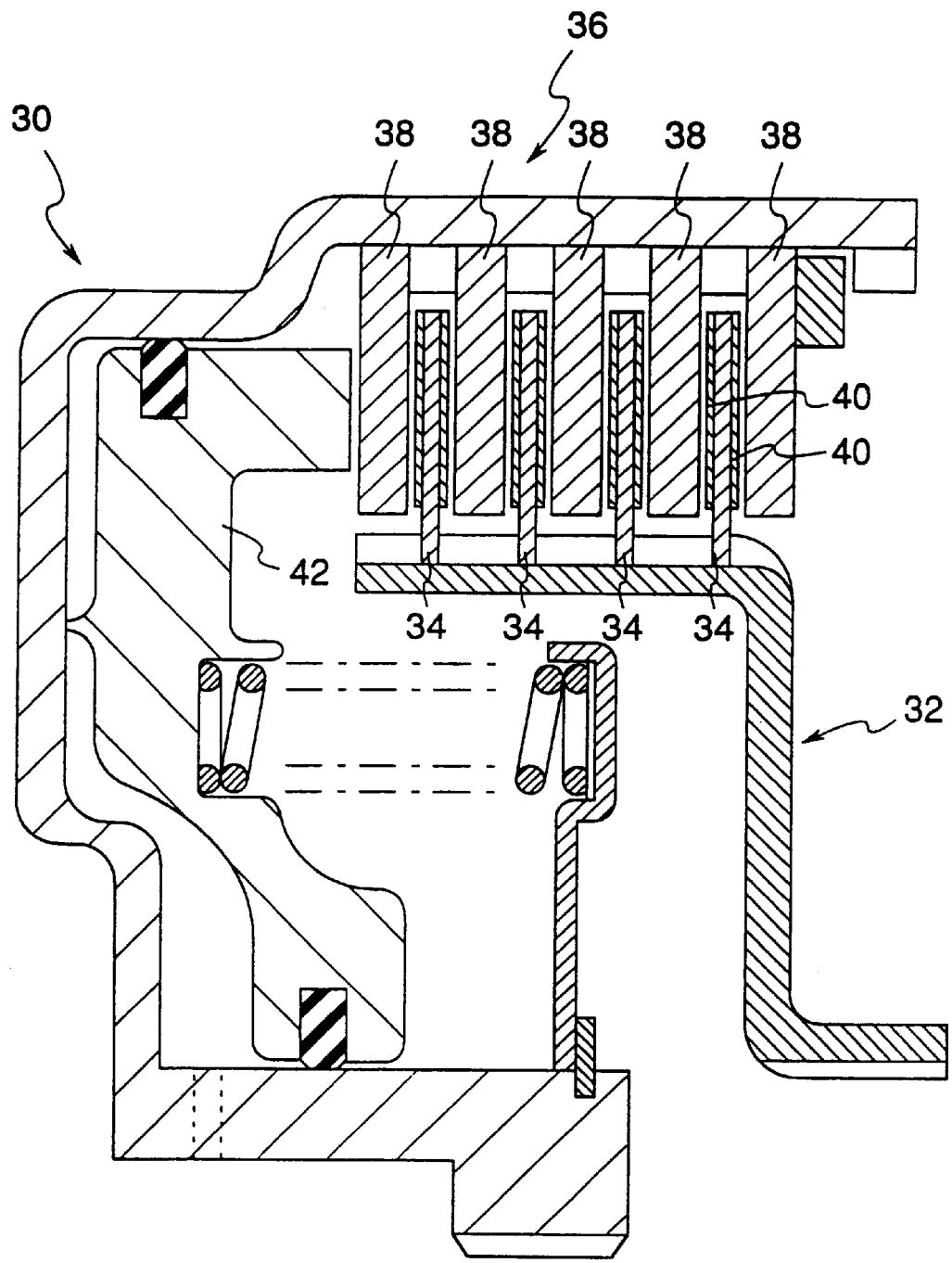
FIG. 3 is a sectional view of a prior art friction engagement device.
Figure 4:
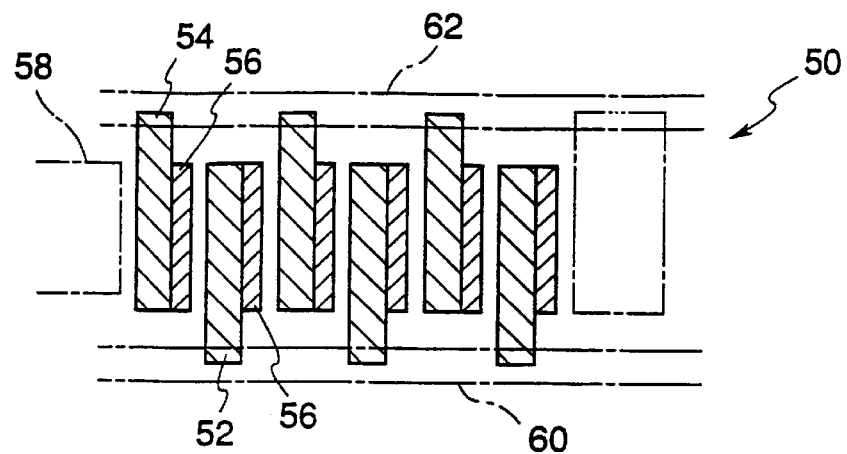
FIG. 4 is a sectional view showing a relation of thickness between an internally-toothed disk and an externally-toothed disk of another prior art friction engagement device.

FIG. 1 shows an embodiment of a friction engagement device according to the present invention. In the friction engagement device 10 an internally-toothed disk 12 and an externally-toothed disk 16 are alternately arranged. On the internally-toothed disk 12 and the externally-toothed disk 16, friction materials 14 and 18 are secured on one side in the axial direction respectively. The internally-toothed disk 12 is splined to a hub 20. The externally-toothed disk 16 is splined to a drum 22. The internally-toothed disk 12 and the externally-toothed disk 16 are held under pressure between a retainer 24 and a piston 26.

The thickness of the externally-toothed disk 16 is less than that of the internally-toothed disk 12. Concretely, the externally-toothed disk 16 is 1.1 mm thick, while the internally-toothed disk 12 is 1.4 mm thick. These values are optimum values experimentally obtained by the use of a specific friction engagement device and therefore naturally vary with the size and number of the internally-toothed disk 12 and the externally-toothed disk 16.

It is an absolute prerequisite that the thickness of the externally-toothed disk 16 is less than that of the internally-toothed disk 12. Thickness optimization is obtained from a point of view to equalize the maximum temperatures of the internally-toothed disk 12 and the externally-toothed disk 16. This is because either one of the disks will be heavily loaded if the maximum temperatures vary from each other.

Figure 5:
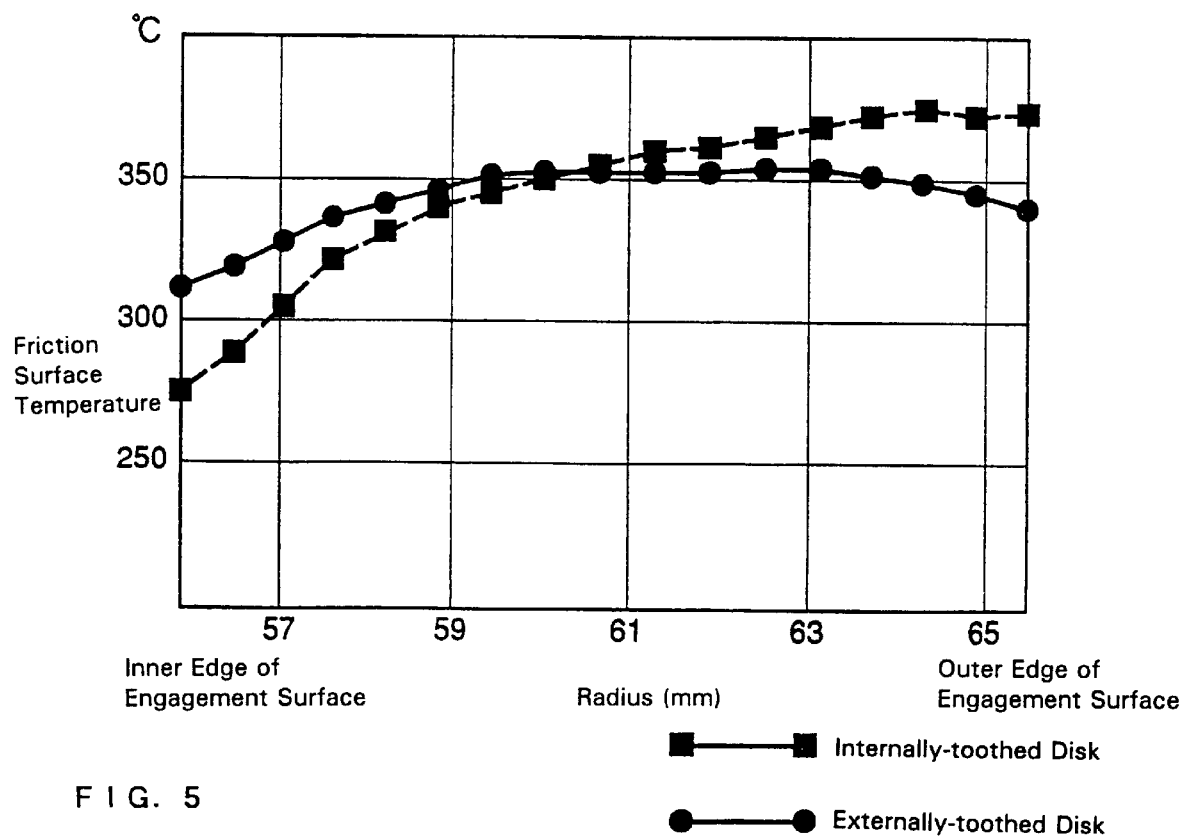
FIG. 5 is a temperature distribution graph of the internally-toothed disk and the externally-toothed disk in the friction engagement device of FIG. 4.

FIG. 2 is a view corresponding to FIG. 5 showing the friction engagement device of the present embodiment used in the experiment, and shows the temperature distribution of the internally-toothed disk 12 and the externally-toothed disk 16. The quantity of heat generated naturally increases as it goes radially outward; however, the maximum temperature of the internally-toothed disk 12 is much the same as that of the externally-toothed disk 16. The equalization of the heat load on the internally-toothed disk 12 and the externally-toothed disk 16 can improve the heat dissipation performance of the whole body of the friction engagement device and accordingly can improve the heat resistance of the device.

The present invention, as described above, has been realized as a result of the research of the principle of heat generation and the routes of heat transmission in the single-faced friction engagement device designed for a specific purpose of use. In the friction engagement device the frictional surface temperatures of the externally-toothed disk and the internally-toothed disk are equalized by making the externally-toothed disk thinner than the internally-toothed disk. Therefore it is possible to improve the heat dissipation performance without changing the size of the device and accordingly is possible to improve the heat resistance.

In other words, because the heat dissipation performance can be maintained as in the prior art device if the externally-toothed disk is made thinner than the internally-toothed disk, the axial size of the friction engagement device can be decreased.

We claim:

1. In a friction engagement device in which one or more internally-toothed disks of a certain axial thickness are interleaved with one or more externally toothed disks of a certain axial thickness and said disks are engageable by a piston, the improvement wherein:

friction material is secured to each said disk on only one side thereof, each said disk being unsecured to friction material on an opposite side of said disk which is axially opposite from said one side, said opposite side facing friction material which is secured to an adjacent disk so as to contact said friction material when said disks are engaged; and said thickness of each said externally-toothed disk measured axially from said one side to said opposite side is less than said thickness of each said internally-toothed disk measured axially from said one side to said opposite side wherein said disks are of a dimension to reduce a temperature differential between said disks at a radially outer edge of said friction material from the temperature differential produced at said radially outer edge when said disks are equal in thickness.

* * * * *